Figure 4:
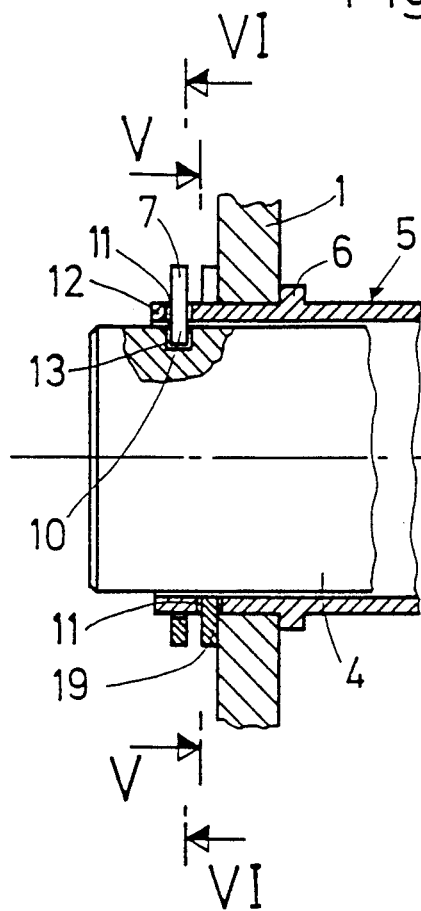

United States Patent [19]

Chara

[11] Patent Number: 5,054,952
[45] Date of Patent: Oct. 8, 1991

[54] DEVICE FOR DETACHABLY FASTENING AND SECURING AN INSERT IN A SLEEVE

[75] Inventor: Alexander Chara, Neuhausen, Switzerland

[73] Assignee: Bucher-Guyer AG Maschinenfabrik, Niederweningen, Switzerland

[21] Appl. No.: 556,447

[22] Filed: Jul. 24, 1990

[30] Foreign Application Priority Data

Aug. 24, 1989 [CH] Switzerland .................. 3072/89

[51] Int. Cl.⁵ ............................................. B25G 3/18
[52] U.S. Cl. .................................. 403/326; 403/108; 285/321; 411/516
[58] Field of Search ............... 403/326, 108; 285/321; 411/516, 517, 518, 519

[56] References Cited

U.S. PATENT DOCUMENTS

| | | | |
|---|---|---|---|
| 2,491,310 | 12/1949 | Heimann | 411/518 |
| 2,855,229 | 10/1958 | Winslow | 411/517 X |
| 3,298,409 | 1/1967 | Elson | 411/516 X |

*Primary Examiner*—Andrew V. Kundrat
*Attorney, Agent, or Firm*—Edmund M. Jaskiewicz

[57] ABSTRACT

To detachably fasten and secure a drainage element (3) on pressing plate (1) of a fruit press, the end of drainage element (3) provided with an insert (4) is inserted into sleeve (5) of pressing plate (1). On sleeve (5) there is placed a retaining ring (7) made as a flat spring ring that carries several cams (9, 10) on its inner periphery. In sleeve wall (12) there are slots (11) in which cams (9, 10) engage. While cams (9) are used to fix retaining ring (7) and to secure sleeve (5) axially, cam (10) is guided through sleeve wall (12) and engages in a recess (13) of insert (4) so that drainage element (3) is secured against axial movement and torsion.

8 Claims, 2 Drawing Sheets

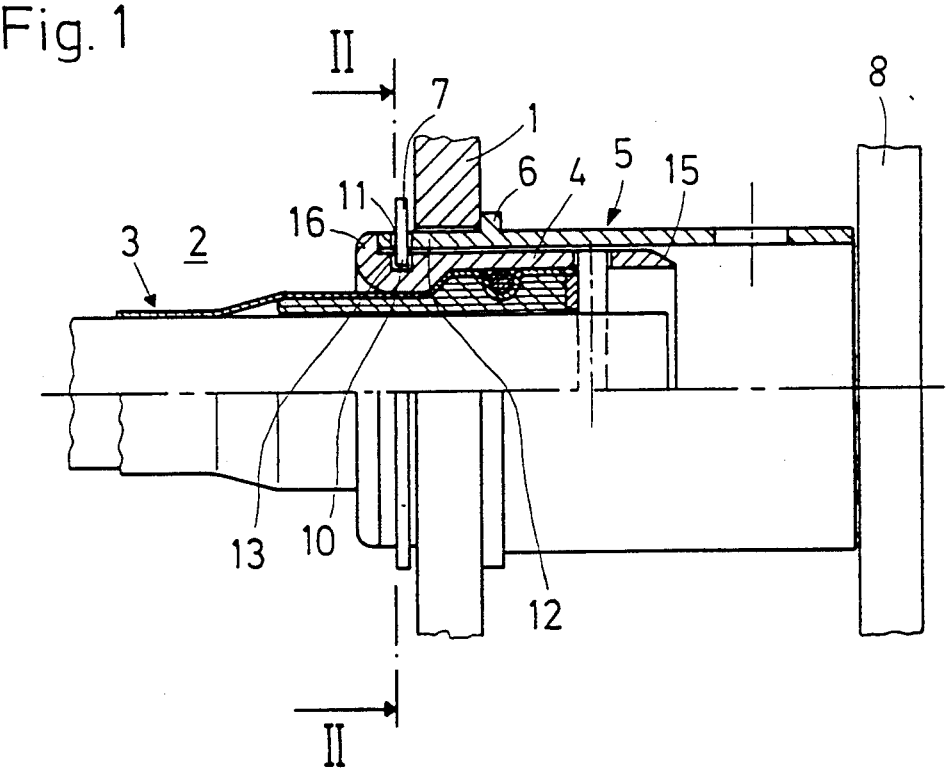
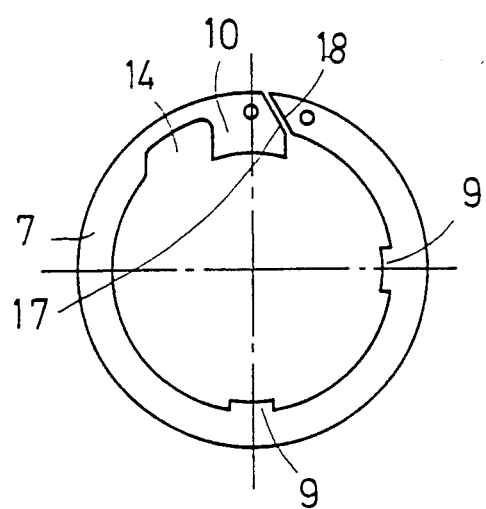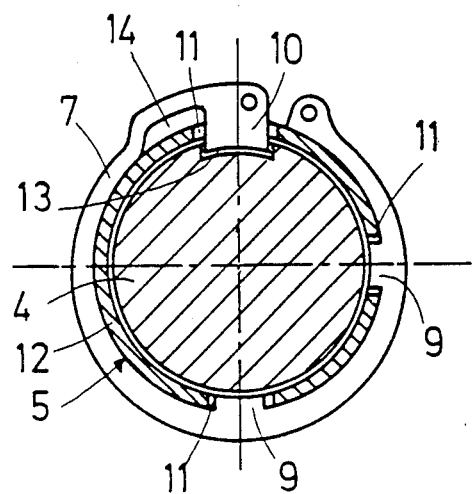

DEVICE FOR DETACHABLY FASTENING AND SECURING AN INSERT IN A SLEEVE

The invention relates to a device for detachably fastening and securing an insert in a sleeve, in particular a drainage element in the pressing plate of a fruit press, with a retaining ring placed on the sleeve and engaging in a recess of the insert.

The drainage elements of a known fruit press consist of flexible round shaped rods that are placed between two pressing plates bordering the pressing chamber of the fruit press. The free ends of the drainage elements are each detachably fastened to a quarter-turn fastener on the pressing plates. For this purpose, on the respective free end of the drainage element there is placed an insert with a quarter-turn profile that is inserted into a sleeve of the pressing plate and is axially secured in the sleeve by turning it about 90°. To secure the insert against torsion in the locked position, a retaining ring made of round spring steel is placed in a ring groove inserted on the outer periphery of the sleeve. The free end, bent at a right angle, of the retaining ring goes through a bore of the sleeve wall and engages in a recess on the outer periphery of the insert. To detach the drainage element, the end of the retaining ring is lifted, the insert is turned back about 90° and lifted out of the sleeve in the axial direction.

The drawback of this kind of fastening is that to receive the retaining ring in the outer wall of the sleeve, a groove with a certain recess depth must be screwed in. This requires a relatively thick sleeve wall that causes higher weight and higher material costs. Further, with sizable loads, the retaining ring can automatically become detached from the groove. Since, because of the required spring action, the wire diameter of the retaining ring is relatively small, the end of the retaining ring engaging in the recess of the insert is stressed unacceptably highly when considerable axial forces are present. Axial relief of the retaining ring by the quarter-turn fastener used in the known embodiment must be gained at the price of relatively high production costs. Another drawback of the known embodiment consists in that, to receive the axial forces, the sleeve must be screwed into the pressing plates of the pressing chamber. This leads to time-consuming and more difficult assembly.

The object of the invention is to avoid the drawbacks mentioned and to provide a device of the initially-mentioned type that makes possible an easily detachable, cost-saving and reliable connection between sleeve and drainage element as well as between sleeve and pressing plate.

According to the invention, this object is achieved in that the retaining ring consists of an elastic material and exhibits on its inner periphery one or more cams that go through appropriate slots in the sleeve wall.

Flat spring steel is suitable as material for the retaining ring.

For simultaneous axial securing and protection against torsion between sleeve and insert, at least one cam is guided inward through the sleeve wall and engages in a corresponding recess on the outer periphery of the insert.

To secure the sleeve axially, the slots to receive the retaining ring are placed in the area of the front face of the sleeve and exhibit an axial distance from a flange of the sleeve, a flange that is somewhat larger than the thickness of the pressing plate in which the sleeve is placed.

Protection of the retaining ring and insert against torsion is achieved in that the length of the slots and the length of the recess correspond to the width of the cams.

According to another feature of the invention, the cam provided for engagement in the insert and a trip slot to detach the cam are placed on one end of the retaining ring.

To lock the insert to the sleeve automatically, the insert exhibits on its front face a slant that interacts with the cam of the retaining ring during insertion into the sleeve and lifts the retaining ring into the detach position.

To increase the holding force of the retaining ring, the end of the retaining ring that carries the cam provided for engagement in the insert is overlapped by the other end of the retaining ring. Here, the ends of the retaining ring each provided with a slant are superposed.

It proves to be especially advantageous if the sleeve is made lying against the back side of the pressing plate and the retaining ring is located on the end of the sleeve facing the pressing chamber.

The advantages achieved with the invention consist especially in that the sleeve wall, because of the design of the retaining ring as a flat spring ring, can be selected to be very thin. The result of this is not inconsiderable weight and cost savings. Further, the space saving achieved results in more favorable assembly conditions. The relatively large bearing width of the cams for receiving the axial forces takes care of an assured force transfer. Another advantage is that, when the cam engaged in the insert is detached, the retaining ring is secured against torsion and falling out, since the other cams of the retaining ring are engaged in the sleeve. The production of the retaining ring of flat spring steel also permits an exact manufacturing by punching.

Figure 5:
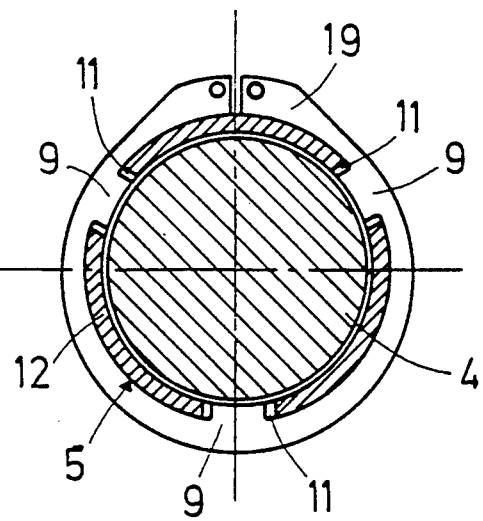

The invention is explained in more detail in the following description and drawing that represents an embodiment. There are shown in:

FIG. 1, a longitudinal section through the fastening of the drainage element,

FIG. 2, a section along line II—II in FIG. 1,

FIG. 3, another embodiment of the retaining ring,

FIG. 4, another embodiment of the fastening in longitudinal section,

FIG. 5, a section along line V—V in FIG. 4, and

Figure 6:
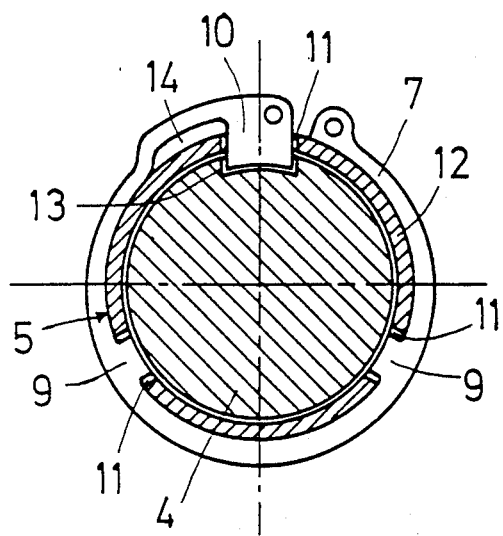

FIG. 6, a section along line VI—VI in FIG. 4.

Several drainage elements 3 are placed in a pressing chamber 2, delimited by a pressing plate 1 each, of a fruit press not represented in more detail. On the end of drainage element 3 there is placed an insert 4 that is inserted into a sleeve 5 of pressing plate 1. Sleeve 5 goes through a bore of pressing plate 1 and has a flange 6 which lies against the outside of pressing plate 1. The front end of sleeve 5 is guided through pressing plate 1 and carries a retaining ring 7 that secures sleeve 5 in axial direction. The tail end of sleeve 5 lies against a face wall 8 of the fruit press that is assembled after installation of sleeve 5.

Retaining ring 7 is designed as a flat spring ring and is provided, on its inner periphery, with several cams 9 and 10 (FIG. 2), in the embodiment shown in FIG. 7 there are two cams 9 and one cam 10. Inward-pointing cams 9 and 10 each go through a slot 11 in sleeve wall 12, a slot whose length is somewhat larger than the width of cams 9 and 10. In this way, retaining ring 7 is secured on sleeve 5 against torsion and sleeve 5 is secured against axial movement. While cams 9 do not project above the inner wall of sleeve 5, cam 10 engages through sleeve wall 12 into a recess 13 located on the outer periphery of insert 4 and whose length is somewhat larger than the width of cam 10. In this way, insert 4 or drainage element 3 is secured against axial movements as well as against torsion. Cam 10 forms the end of retaining ring 7 and can be lifted by a trip slot 14 also placed on the end of retaining ring 7 so that insert 4 is released and drainage element 3 can be removed.

The front face of insert 4 exhibits a slant 15 which, when insert 4 is inserted into sleeve 5, strikes cam 10 and lifts it against the spring resistance of retaining ring 7. Insert 4 which has a flange 16 is pushed into sleeve 5 until flange 16 lies against the face of sleeve 5. After that, insert 4 or drainage element 3 is twisted until cam 10 engages in recess 13 and insert 4 is locked with sleeve 5.

In FIG. 3, another embodiment of retaining ring 7 is represented. The end of retaining ring 7 carrying cam 10 exhibits a slant 17 which is overlapped by a slant 18 of the other end of retaining ring 7. When cam 10 is lifted, slant 17 presses on slant 18, which offers a greater resistance to a further lifting of cam 10 and thus leads to an increased holding force of retaining ring 7.

FIGS. 4 to 6 show an embodiment in which an additional retaining ring 19 is provided. Retaining ring 19 placed on sleeve 5 lies against the inside of pressing plate 1 and thus serves to secure sleeve 5 axially. Three cams 9 placed on the inner periphery of retaining ring 19 engage into slots 11 of sleeve 5 and secure the position of retaining ring 19 on sleeve 5. Retaining ring 7 is placed at an axial distance from retaining ring 19 and, as in the embodiment according to FIG. 1, assumes the function of axially and radially securing insert 4, but without axially securing sleeve 5.

In other embodiments of the invention not represented, retaining ring 7 or 19 can, for example, also be combined with a quarter-turn fastener, as it is used in a known way to fasten and secure drainage elements in the pressing plate of a fruit press. Here there is also the possibility of providing, instead of the plug connection between pressing plate 1 and sleeve 5, a screw connection.

The use of the fastening and securing according to the invention is not limited to drainage elements for fruit presses. It can be used advantageously wherever an insert is to be secured in a sleeve and/or the sleeve is to be secured in a plate against axial and radial movements.

It will be understood that this invention is susceptible to modifications to adapt it to different usages and conditions and, accordingly, it is desired to comprehend such modifications within this invention as may fall within the scope of the appended claims.

What is claimed is:

1. Device for detachably fastening and securing an insert in a sleeve, in particular a drainage element in the pressing plate of a fruit press, with a retaining ring that is placed on the sleeve and which engages in a recess of the insert, said retaining ring (7, 19) comprises a resilient spring material and has an inner periphery, there being one or more cams (9, 10) on said inner periphery that extend through corresponding slots (11) in sleeve wall (12), said insert (4) being received within said sleeve and having a recess (13) on the outer periphery thereof, said recess having a length corresponding to the width of a said cam, at least one cam (10) is guided through a said slot (11) in said sleeve wall (12) and engages in a said corresponding recess (13) so that the insert is secured within said sleeve against axial movement.

2. Device according to claim 1, wherein said slots (11) are disposed in the area of the front face of sleeve (5) and spaced an axial distance from a flange (6) of sleeve (5), said axial distance being greater than the thickness of pressing plate (1) in which sleeve (5) is inserted.

3. Device according to claim 1, wherein the length of slots (11) and the length of recess (13) correspond to the width of cams (9, 10).

4. Device according to claim 1, wherein said cam (10) and a trip slot (14) to detach cam (10) are disposed on one end of retaining ring (7).

5. Device according to claim 1, wherein insert (4) has on its front face a taper (15) which, during insertion into sleeve (5), interacts with cam (10) of retaining ring (7) and lifts said cam (10) into a detach position.

6. Device according to claim 1 wherein the end of retaining ring (7), which carries cam (10) is overlapped by the other end of retaining ring (7).

7. Device according to claim 6, wherein the ends (17, 18) of retaining ring (7) are each slanted with respect to a radius of the ring and are superposed.

8. Device according to claim 2 wherein said retaining ring is disposed on an end of the sleeve facing the pressing chamber, wherein sleeve (5) is positioned against a back side of pressing plate (1).

* * * * *